(12) United States Patent
Chevallier et al.

(10) Patent No.: US 7,352,551 B2
(45) Date of Patent: Apr. 1, 2008

(54) GAS-INSULATED ELECTRICAL INSTALLATION PROVIDED WITH A DEVICE FOR DISSIPATING ENERGY PRODUCED BY AN ELECTRIC ARC

(75) Inventors: Patrick Chevallier, Voiron (FR); Jean-Claude Faye, Seyssinet (FR); François Gentils, Grenoble (FR); Stéphane Giraud, Grenoble (FR); Dominique Serve, Saint Ismier (FR)

(73) Assignee: Schneider Electric Industries SAS, Rueil-Malmaison (FR)

(*) Notice: Subject to any disclaimer, the term of this patent is extended or adjusted under 35 U.S.C. 154(b) by 542 days.

(21) Appl. No.: 10/512,225

(22) PCT Filed: May 5, 2003

(86) PCT No.: PCT/FR03/01383

§ 371 (c)(1),
(2), (4) Date: Oct. 22, 2004

(87) PCT Pub. No.: WO03/098760

PCT Pub. Date: Nov. 27, 2003

(65) Prior Publication Data

US 2005/0174721 A1    Aug. 11, 2005

(30) Foreign Application Priority Data

May 15, 2002   (FR)   .................................. 02 05942

(51) Int. Cl.
*H02H 9/00*   (2006.01)

(52) U.S. Cl. ...................................................... 361/118
(58) Field of Classification Search ................. 361/118
See application file for complete search history.

(56) References Cited

U.S. PATENT DOCUMENTS 3,552,653 A * 1/1971 Inoue ........................... 239/81

FOREIGN PATENT DOCUMENTS

| DE | 530 905    | 8/1931  |
| DE | 28 17 418  | 10/1979 |
| DE | 195 20 698 | 12/1996 |
| DE | 196 48 547 | 5/1998  |

* cited by examiner

Primary Examiner—Stephen W. Jackson
(74) Attorney, Agent, or Firm—Steptoe & Johnson LLP

(57) ABSTRACT

An electrical equipment containment is arranged on a cooling enclosure opening out onto the outside. An outlet orifice makes the containment communicate with the cooling enclosure. This orifice is closed by a membrane or a check valve. A grate separates the cooling enclosure into an upper volume and a lower volume. The grate supports a layer of solid granular material the upper surface whereof remains free. This material is preferably porous and also comprises dusts. In the event of an internal electric arc, the shock wave escaping from the containment is dampened by the surface deformation of the layer of solid material. The incandescent particles projected via the opening are stopped by the layer of solid material. The hot gases are cooled as they flow through the material, causing a cloud of dust contributing to preventing any post-combustion.

11 Claims, 2 Drawing Sheets

GAS-INSULATED ELECTRICAL INSTALLATION PROVIDED WITH A DEVICE FOR DISSIPATING ENERGY PRODUCED BY AN ELECTRIC ARC

BACKGROUND OF THE INVENTION

The invention relates to an electrical installation comprising an enclosure wherein there are arranged conductors and, possibly, electrical apparatuses such as current breaking, measuring, switching or electrical transformation apparatuses. More particularly, but in non-exclusive manner, the invention relates to a high-voltage electrical installation with gas insulation. In the whole of the text, the term "high voltage" will be taken in its broadest sense as also including what is known in certain countries as the field of "medium voltage".

STATE OF THE PRIOR ART

High-voltage electrical installations are subject to disfunctionings able to result in a short-circuit giving rise to an electric arc of very high energy. When the electrical installation comprises an enclosure, we refer to an internal arc to designate this uncontrolled arc. The internal arc gives rise to flows of hot gases, sometimes flammable or inflamed, at high pressure, preceded or accompanied by pressure waves. Measures therefore have to be taken to prevent on the one hand the electric arc from causing explosion of the enclosure and destruction of the installation and its environment, and on the other hand a too violent escape of hot or inflamed gases outside of the enclosure. These protections for equipment and persons are very delicate to achieve and very costly, as the energies involved are considerable.

In the document DE3,424,363, it has been proposed to provide a flow of hot gases generated by the internal arc through a filter designed to cool the gases emitted by the internal arc. The first function of the filter is to cool the gases escaping from the cubicle. The filter is therefore filled with a material having a large heat exchange surface and a high heat capacity. Among the materials envisaged, corrugated metal sheets of small thickness, gravel or crushed minerals are mentioned. These materials have the drawback of being dense, or of large filter mass. The filter is confined in a pressure-resistant enclosure provided with an inlet orifice and an outlet orifice. Such an arrangement has the drawback of not allowing adequate absorption of the shock wave. The filter is liable to be destroyed and to no longer fulfil its function when the gases flow. Moreover, the shock wave is slightly attenuated and presents in itself a direct danger for the environment.

To deal with this specific problem of shock wave, it has been proposed in the document DE19,520,698 to make the gases escaping from a high-voltage electrical cubicle flow via an exhaust valve in an elbow duct to a cooling filter. The elbow performs a reflection of the shock wave, supposed to defocus the wave, which enables the quantity of material in the filter to be reduced. This arrangement gives rise to certain problems of dimensions. In addition, the wall of the elbow duct performing reflection of the shock wave has to be of sufficient rigidity not to be destroyed by the shock wave, whence a high cost price. Wave reflections in the elbow duct are moreover difficult to control and their effect on the flow may be counter-productive.

It is further known, as divulged in another context by the document DE 530,905, that it may be interesting to propagate a cloud of mineral dust when an explosion occurs, to prevent propagation of the flames. It has in fact been proposed in this document to envelop an electrical machine operating in an explosive environment, for example in a mine, in an enclosure filled with dust. In the event of explosion of the machine, the dust is disseminated in the form of a cloud and prevents propagation of sparks. However, such an arrangement encounters the technical difficulty of preserving a dust in non-agglomerated form for a long period. Furthermore, it does not enable the shock wave of the explosion to be broken.

SUMMARY OF THE INVENTION

The object of the invention is therefore to overcome the drawbacks of the state of the art so as propose an electrical installation protected against the effects of the internal arc by a device that is inexpensive, not cumbersome, relatively light and of very great efficiency, both to absorb the shock wave emitted by the internal arc and to prevent propagation of hot or even inflamed gases, or post-combustion or spontaneous flaming phenomena of gases at a distance from the installation.

For this purpose, the object of the invention is to provide an electrical installation comprising:
- a containment enclosure of a functional unit with gas insulation,
- an outlet path from the inside of the containment enclosure to the outside for removal of a gas flow due to an internal electric arc in the containment enclosure,
- a porous layer of non-combustible solid granular material arranged in the outlet path so that the gas flow passes therethrough, the layer being composed and arranged in such a way as to generate a cloud of non-combustible solid dusts when the gas flow passes through the porous layer.

The presence of fine non-combustible airborne particles in the gas modifies both the stoechiometry of the mixture, its heat capacity and its kinetics. Globally it prevents self-combustion of the gas downstream from the layer.

Preferably, the solid granular material is non-agglomerated to allow movement between the grains. Moreover, it is advantageous that the solid granular material be friable. When the shock wave accompanying the internal arc reaches the layer, the grains rub against one another and crumble. These mechanical movements and transformations absorb the energy of the shock wave. Naturally, the crumbling produces dusts which contribute to formation of the cloud. The friability of the material can be measured by a modified micro-Deval type test. The micro-Deval test is conventionally intended to determine the wear resistance that characterizes the capacity of a rock in granulate form to withstand the action of road traffic, and in particular the wear resulting from the friction of the particles between one another when dry. For the modified test, a sample of M=500 grams of previously washed and dried material is prepared, formed by grains with a diameter comprised between 10 and 14 mm. The sample is placed, along with 2 kg of stainless steel balls with a diameter of 10 mm, in a stainless steel cylinder equipped with an internal rubber lining and closed by a tight cover. The closed cylinder is rotated 3,000 times around its horizontally placed axis in 30 minutes, and the material is then screened through a 1.6 mm test sieve. The weight $M_1$ of the screen overflow is then weighed. The parameter MD characteristic of the friability is then obtained by the expression: $MD=100\,(M-M_1)/M$, which determines the percentage of fines formed by attrition. With this indicator, it is considered that a material will be sufficiently friable if the factor MD is greater than 10. For example purposes, the results obtained by the test for different materials tested are set out in the table below:

| material | MD |
|---|---|
| Basalt | 2 |
| Pozzolana | 16-17 |
| Siporex ® | 17 |
| Pumice | 40-42 |

Porous materials offer the advantage of a very low apparent density combined with a high heat capacity. Furthermore, these materials have a large surface roughness which enhances dissipation of energy by friction when the grains are agitated when the shock wave passes. Materials will preferably be chosen which combine porosity and friability. Among the materials giving interesting results, the following are noteworthy: pumice stone, pozzolana and Siporex®.

The layer of granular material preferably contains non-combustible solid dust, in disseminated manner in the solid granular material, to form said cloud. This arrangement avoids the risk of agglomeration of the dusts which could take place after a few years, for example in the presence of humidity or vibrations. Such an agglomeration would in fact be very harmful: the cloud of dusts would no longer be able to form and the agglomerated dust could even form a plug hindering the progression of the gases causing explosion of the installation. Naturally the presence of dust disseminated in the material is not incompatible with the choice of a friable material, quite on the contrary.

According to one embodiment, the gas removal path is closed by a sealing means opening automatically when it is subjected to a pressure difference exceeding a preset threshold. The containment enclosure is then a tight enclosure. The gas can be a gas with a greater dielectric strength than air, for example sulphur hexafluoride.

Advantageously, the layer is arranged downstream from the sealing means. The gas removal path broadens out from the sealing means to the layer, forming a gas expansion volume. The gas removal path presents an opening section, at the level of the sealing means, the layer presenting a free external surface situated facing the sealing means having an area larger than three times the area of the opening section. Under the geometric conditions thus defined, the gas shoots out at the level of the sealing means in the form of a dart. The efficiency of the layer of material enables the latter to be arranged in the dart. The gas expansion zone situated between the sealing means and the layer of granular material is thus greatly reduced, which enables the surface of the walls confining the gas removal path to be reduced, whence less stress being exerted on these walls by the pressure wave reaching the layer, and limitation of the deformations of the installation.

According to one embodiment, the free external surface is situated, with respect to the opening section, at a distance smaller than six times a characteristic opening diameter, defined as being the diameter of the largest circle inscribed in said opening section.

This arrangement enables, in the event of an internal arc generating a pressure or shock wave, a large deformation of the material in the zone directly facing the orifice which absorbs the shock wave energy and prevents propagation thereof beyond the layer of granular material. The use of a very rough and/or friable granular material enables the layer of material to be located considerably closer to the communication orifice, which contributes to reducing the pressure in the volume that has remained free between the communication orifice and the surface of the layer of material.

According to one embodiment, the functional unit is a high-voltage unit, in the broad sense of the term including in particular medium voltage. However application to low-voltage installations is not excluded.

BRIEF DESCRIPTION OF THE FIGURES

Other advantages and features will become more clearly apparent from the following description of particular embodiments of the invention given as non-restrictive examples only and represented in the accompanying drawings in which.

DETAILED DESCRIPTION OF AN EMBODIMENT

Figures 1, 2:
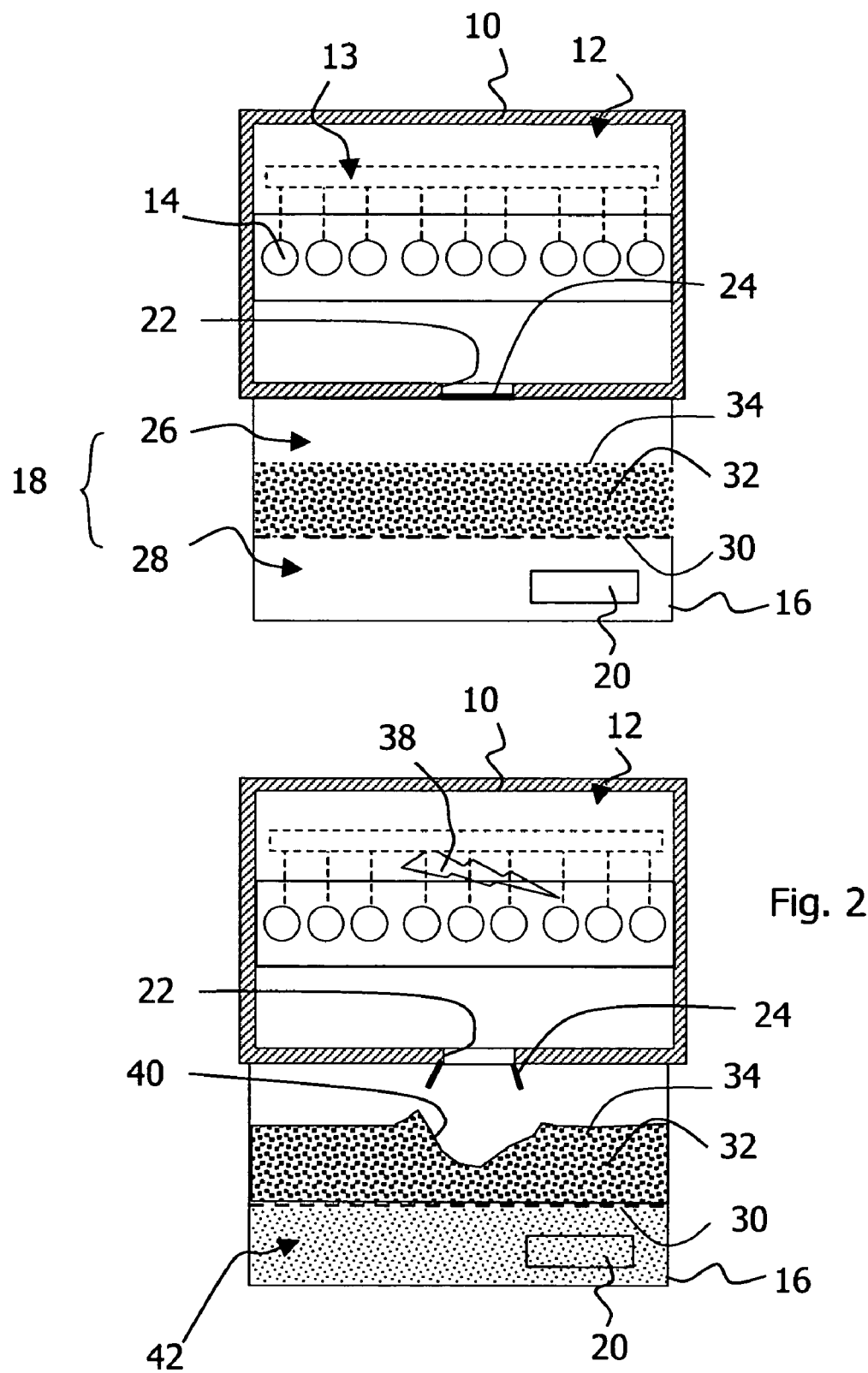
FIG. 1 represents a schematic cross-sectional view of an electrical installation according to the invention.
FIG. 2 represents a schematic cross-sectional view of the installation of FIG. 1, following an internal electrical fault.

With reference to FIG. 1, a high-voltage electrical installation comprises a sealed enclosure 10 forming a containment 12 containing a high dielectric strength gas, for example sulphur hexafluoride, and housing a high-voltage functional unit 13, represented in schematic manner by a broken line in FIG. 1, comprising electrical conductors under high voltage, that may be connected to electrical apparatuses such as for example circuit breakers, disconnectors, earthing switches, cut-outs, switches, or distribution transformers or measuring auxiliaries and connected to the outside by means of bushings 14. This sealed enclosure 10 is arranged on a base 16 the walls whereof form, with a bottom wall of the enclosure, a cooling enclosure 18 provided at the bottom part with an escape outlet 20. The bottom wall of the containment 12 is provided with an outlet orifice 22 making the containment communicate with the cooling enclosure. In normal operation, this orifice 22 is closed by a membrane 24.

The containment is divided into an upper volume 26 and a lower volume 28 by a rigid horizontal grate 30. The rigid grate 30 supports a layer of solid granular material 32. Naturally, the grate 30 is calibrated so as not to let the grains of the solid material 32 it supports pass through. The more or less flat upper surface 34 of the layer of granular material is free or held by a deformable net. An unfilled expansion volume remains between the bottom wall of the containment enclosure 10 and the upper free surface 34 of the material.

The solid granular material 32 is preferably a porous mineral of low apparent density, with open or closed porosity, for example pumice stone or pozzolana. A large volume of material is thus obtained for a relatively low mass. Materials comprising large quantities of mineral dusts which, as will be seen, play a role in stifling the flames and cooling the gases, are also preferred.

Non-porous granular materials, such as fine foundry sands deposited on a sheet of paper, which form a cloud when the gas flow passes, can also be used. The necessary mass is then greater.

In the event of a major incident in the containment generating an internal electric arc 38, the membrane 24 breaks, as represented in FIG. 2, letting a jet of hot gases and incandescent solid particles, accompanied by a pressure wave, flow through the outlet orifice. In practice, the jet is generally supersonic and the wave is a shock wave. The jet bores a crater 40 in the granular material. The incandescent particles accompanying the explosion are stopped in the first millimeters of the layer of material which acts as a filter for the latter. The gases under pressure flow through the granular material and cool by heat exchange in contact with the grains before exiting via the grate 30 into the lower volume 28, accompanied by a cloud of dust 42. This cloud of solid particles 42 that accompanies the gases beyond the layer of material contributes to cooling of the gases. This cloud appears all the more useful as, unlike the state of the technique, the gases exiting from the apparatus have not been totally consumed, so that a flashover may cause a chain reaction with the ambient air leading to post-combustion. The presence of the solid airborne particles in the gas modifies both the stoechiometry of the mixture, its heat capacity and its kinetics, globally contributing to inhibiting re-combustion.

Empirically, it can be observed that it is possible to place the layer of granular material at a small distance from the orifice. It seems that the deformation of the filter when the explosion takes place contributes very greatly to damping the shock wave and minimizes the pressure increase in the cooling enclosure.

Without wishing to present here a complete theory of the phenomena in presence, let us point out that the orifice acts as a nozzle so that, in the absence of the layer of granular material, the jet would take the shape of a conical focal point, also called a dart, the base whereof is formed by the perimeter of the orifice and the peak whereof would be situated approximately at a distance equal to 6 times the diameter of the base. But, due to the great proximity of the layer of granular material, the jet encounters the free surface of the granular material before its focussing point, boring a crater therein. The grains constituting the material are repositioned, causing frictions accompanied by an appreciable crumbling and formation of dust. In this respect, the roughness of the grains constituting the material is advantageous as it enhances dissipation of energy by friction and erosion. The energy of the jet and of the shock wave is transferred to the grains, contributing to displacing and crushing them. Globally, the layer of material plays a role of absorption of the incident energy of the wave and prevents propagation of the shock wave through the layer of material. On account of the high apparent roughness of the interface formed by the upper surface of the layer of material, the reflection of the wave at the free surface of the layer of material is also greatly attenuated so that the pressure increase in the free volume above the free surface of the layer of material is also limited.

A deformable grate or net can possibly be provided to cover the top surface of the layer of granular material to keep the material in place. However, this net or grate must not hamper the large deformation 40 of the layer of material by the shock wave.

Figure 3:
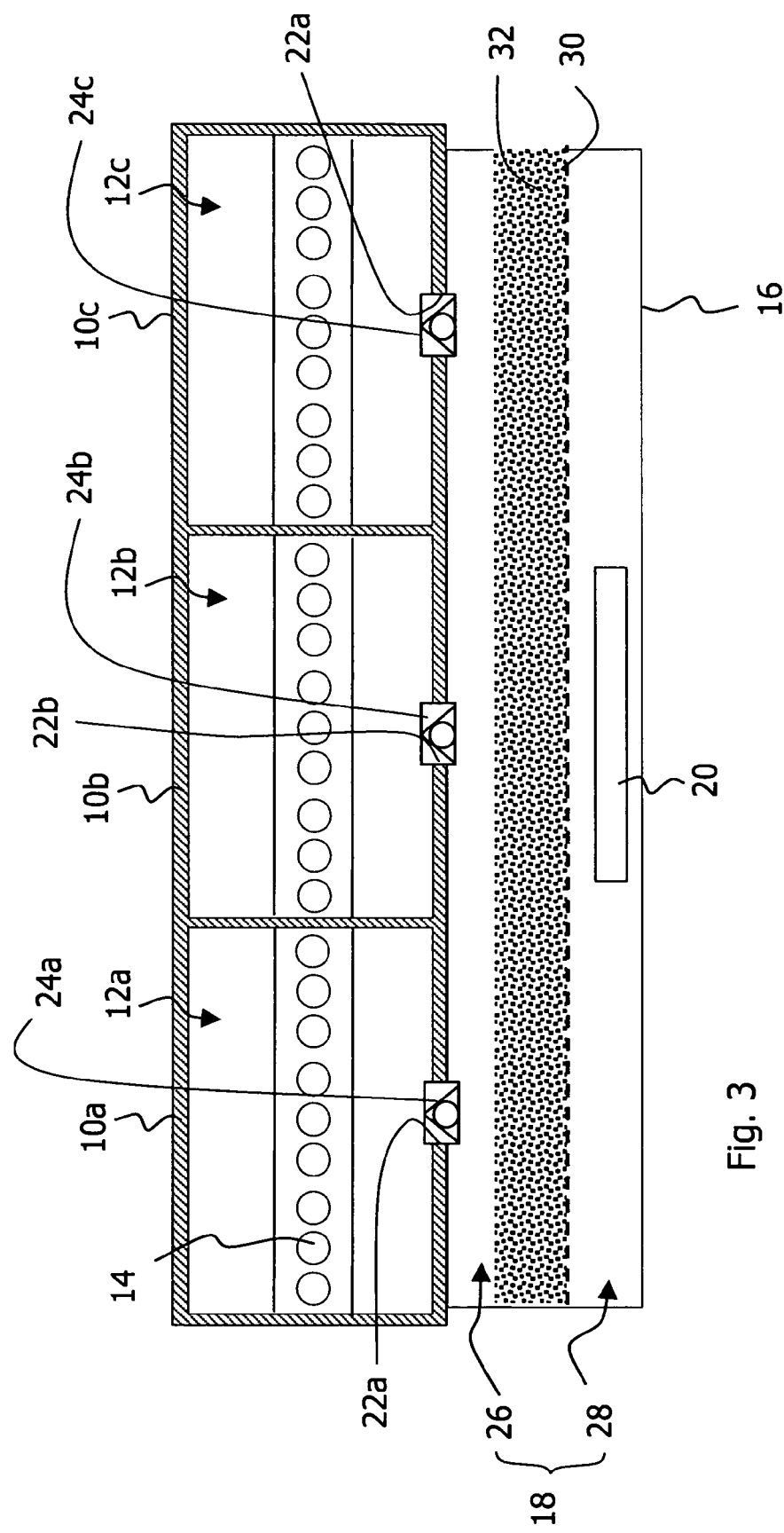
FIG. 3 represents a schematic cross-sectional view of a second embodiment of the invention.

A second embodiment of the invention is represented in FIG. 3. According to this embodiment, an electrical distribution installation comprises a plurality of high-voltage cubicles. Each cubicle comprises a tight enclosure 10a, 10b, 10c forming a containment 12a, 12b, 12c for high-voltage electrical equipment. The cubicles are supported by a common base 16 forming a common cooling enclosure 18. Each cubicle is provided, on its bottom wall, with an outlet orifice 22a, 22b, 22c closed by a check valve 24a, 24b, 24c. As in the first embodiment the cooling enclosure 18 comprises an intermediate grate 30 supporting one or more layers of granular material 32. Operation of the installation in the event of an internal electric arc in one of the cubicles is identical to that described previously for the first embodiment. It should however be noted that by replacing the membranes of the first embodiment by check valves, it is guaranteed that the pressure increase undergone in the upper volume of the cooling enclosure at the beginning of the incident does not cause a gas inlet to the unaffected adjacent cubicles.

Naturally various modifications are possible.

The membrane used to close the communication orifice can be replaced by a valve opening when the difference between the pressure prevailing in the containment and the pressure prevailing in the cooling enclosure exceeds a given threshold.

The solid granular material can be arranged in several layers that may be separated by rigid or non-rigid grates. The different layers can have different granulometries. More generally, the different layers can be formed by different materials.

It is also envisageable to use an agglomerated granular material, provided that the grains are of sufficiently large diameter and that paths remain between the grains for the gases to flow. In this respect, a rigid plate made from grains of pozzolana, with a diameter of 10 to 15 mm for example, bonded by a refractory cement, in particular a pozzolana dust-based cement, can constitute an interesting alternative. The advantage of such a solution is to facilitate positioning of the filter, vertically or obliquely for example. The dust naturally contained in the pozzolana then suffices to cause the required cloud.

A non-homogeneous material comprising grains having different diameters can also be used as solid granular material.

The gas present in the containment can be air. The containment may or may not be under pressure.

The invention is also applicable to low-voltage installations.

The invention claimed is:

1. Electrical installation comprising:
   a containment enclosure of a functional unit having gas insulation,
   an outlet path from inside of the containment enclosure to the exterior thereof for removal of a gas flow due to an internal electric arc in the containment enclosure, and
   a porous layer of non-combustible solid granular material arranged in the outlet path so that the gas flow passes therethrough,
   wherein said porous layer is confined in a cooling enclosure connected to the containment enclosure by an outlet orifice, said porous layer being arranged to generate a cloud of non-combustible solid dust when a gas flow passes through the outlet orifice and the porous layer confined in the cooling enclosure.

2. Electrical installation with gas insulation according to claim 1, characterized in that the solid granular material is non-agglomerated.

3. Electrical installation with gas insulation according to claim 2, characterized in that the solid granular material is friable.

4. Electrical installation with gas insulation according to claim 1, characterized in that the solid granular material is comprised at least partially by porous grains.

5. Electrical installation with gas insulation according to claim 4, characterized in that the porous grains are selected from the group consisting of grains of pumice stone, pozzolana and Siporex.RTM.

6. Electrical installation with gas insulation according to, claim 1 characterized in that the layer of granular material contains non-combustible solid dust, in disseminated manner in the solid granular material, to form said cloud.

7. Electrical installation with gas insulation according to claim 1, characterized in that the gas removal path is closed by a sealing means opening automatically when it is subjected to a pressure difference exceeding a preset threshold.

8. Electrical installation with gas insulation according to claim 1, characterized in that the gas removal increases in volume from the sealing means to the layer outlet orifice, forming a gas expansion volume.

9. Electrical installation with gas insulation according to claim 8, wherein the porous layer presents a free external surface facing the outlet orifice and having an area larger than three times the area of the opening section of the outlet orifice.

10. Electrical installation with gas insulation according to claim 9, characterized in that the free external surface is located, with respect to the opening section, at a distance smaller than six times a characteristic opening diameter, defined as being the diameter of the largest circle inscribed in said opening section.

11. Electrical installation with gas insulation according to claim 10, characterized in that the functional unit is a high-voltage unit.

* * * * *